US010008334B2

(12) United States Patent
Beguin et al.

(10) Patent No.: US 10,008,334 B2
(45) Date of Patent: Jun. 26, 2018

(54) ELECTROCHEMICAL CAPACITOR

(71) Applicants: CNRS, Paris (FR); UNIVERSITE D'ORLEANS, Orleans (FR)

(72) Inventors: Francois Beguin, Olivet (FR); Laurent Demarconnay, Olivet (FR); Encarnacion Raymundo-Pinero, Orleans (FR)

(73) Assignees: CNRS, Paris (FR); Universite D'Orleans, Orleans (FR)

( * ) Notice: Subject to any disclaimer, the term of this patent is extended or adjusted under 35 U.S.C. 154(b) by 343 days.

(21) Appl. No.: 14/030,271

(22) Filed: Sep. 18, 2013

(65) Prior Publication Data

US 2014/0016247 A1 Jan. 16, 2014

Related U.S. Application Data

(63) Continuation of application No. PCT/EP2011/054147, filed on Mar. 18, 2011.

(51) Int. Cl.
| | |
|---|---|
| H01G 9/00 | (2006.01) |
| H01G 9/02 | (2006.01) |
| H01G 9/04 | (2006.01) |
| H01G 9/145 | (2006.01) |
| H01G 11/32 | (2013.01) |
| H01G 11/86 | (2013.01) |

(Continued)

(52) U.S. Cl.
CPC ............. *H01G 9/035* (2013.01); *H01G 9/038* (2013.01); *H01G 9/145* (2013.01)

(58) Field of Classification Search
CPC ........ H01G 9/022; H01G 9/035; H01G 9/145; H01G 11/32; H01G 11/86

USPC .......................... 361/505, 502, 508, 516, 503
See application file for complete search history.

(56) References Cited

U.S. PATENT DOCUMENTS

| | | | | | |
|---|---|---|---|---|---|
| 5,754,393 | A | * | 5/1998 | Hiratsuka | H01G 9/155 |
| | | | | | 361/502 |
| 5,982,050 | A | * | 11/1999 | Matsui | H02J 7/0016 |
| | | | | | 307/10.7 |
| 6,788,523 | B1 | | 9/2004 | Hossick-Schott et al. | |

(Continued)

FOREIGN PATENT DOCUMENTS

| | | |
|---|---|---|
| EP | 1335395 A1 | 8/2003 |
| EP | 2323146 A1 | 5/2011 |

(Continued)

OTHER PUBLICATIONS

International Search Report issued in International Application No. PCT/EP2011/054147.

*Primary Examiner* — Eric Thomas
*Assistant Examiner* — Arun Ramaswamy
(74) *Attorney, Agent, or Firm* — Brinks Gilson & Lione (57) ABSTRACT

An electrochemical capacitor includes a first electrode connected to a positive terminal of a power source during the charge of the electrochemical capacitor and a second electrode connected to a negative terminal of a power source during the charge of the electrochemical capacitor. The first and the second electrodes each have a carbon material. The electrochemical capacitor further includes a porous separator to separate the first and second electrodes and to be impregnated with an almost neutral aqueous electrolyte situated between the two electrodes. The neutral aqueous electrolyte has a salt formed by a metallic cation and an anion.

13 Claims, 8 Drawing Sheets

(51) Int. Cl.
*H01G 9/035* (2006.01)
*H01G 9/022* (2006.01)

(56) References Cited

U.S. PATENT DOCUMENTS

| | | | |
|---|---|---|---|
| 7,440,257 B2 | 10/2008 | Kirchner et al. | |
| 7,541,312 B2 | 6/2009 | Dietz et al. | |
| 7,936,556 B2 | 5/2011 | Beguin et al. | |
| 2002/0097549 A1* | 7/2002 | Maletin | H01M 4/583 |
| | | | 361/502 |
| 2004/0047798 A1* | 3/2004 | Oh | C01B 31/00 |
| | | | 423/414 |
| 2008/0151472 A1* | 6/2008 | Maletin | H01G 9/016 |
| | | | 361/502 |
| 2010/0296226 A1* | 11/2010 | Nanba | B82Y 30/00 |
| | | | 361/502 |

FOREIGN PATENT DOCUMENTS

| | | |
|---|---|---|
| JP | H04177713 A | 6/1992 |
| JP | H11121283 A | 4/1999 |
| JP | 2001093784 A | 4/2001 |
| JP | 2001185452 A | 7/2001 |
| JP | 2002247702 A | 8/2002 |
| JP | 2006503441 A | 1/2006 |
| JP | 2007529403 A | 10/2007 |
| JP | 2010511302 A | 4/2010 |
| WO | 2006111079 A1 | 10/2006 |

\* cited by examiner

ELECTROCHEMICAL CAPACITOR

CROSS-REFERENCE TO RELATED APPLICATIONS

This application is a continuation of International Application No. PCT/EP2011/054147, filed on Mar. 18, 2011. The disclosures of the above application are incorporated herein by reference.

FIELD

The present disclosure relates to an electrochemical capacitor, an electrochemical capacitor assembly and an electrical circuit each comprising one or more of such electrochemical capacitors.

BACKGROUND

The statements in this section merely provide background information related to the present disclosure and may not constitute prior art.

An electrochemical capacitor in this case is a device for storing the electrical energy resulting from the separation of charged species and/or from redox reactions.

Recently, the interest in electrochemical capacitors has considerably increased as they are able to boost the power of systems. In the hybrid vehicles for example, the electrochemical capacitors are used to collect the braking energy and provide the power peaks during acceleration and slopes climbing. Applying electrochemical capacitor modules in hybrid vehicles allows a substantial amount of fuel to be saved. For full electric vehicles, capacitors can also contribute to increase the electrical yield.

The use of electrical double-layer capacitors where the charged species are separated at the electrode/electrolyte interface is known. In this case the electrical energy is stored in electrostatic form by charge separation.

The electrodes are usually made of activated carbons (hereinafter called "AC"). In the present disclosure, the wording "X/Y electrodes" means that the first electrode is made with material X and the second electrode is made with material Y.

There are different types of electrolyte. A first type is an organic electrolyte. Such an organic electrolyte means an electrolyte wherein the main component is not water and has no more than traces of water. Typically, the solvent of such organic electrolyte is acetonitrile or propylene carbonate. Organic electrolyte has the advantage of having a high maximum operating voltage U generally up to 2.7 V.

Therefore, organic electrolytes are usually preferred to obtain improved energy density, as shown in the following general formula:

$$E = \tfrac{1}{2}CU^2 \qquad \text{(equation 1)}$$

wherein the energy density (E) of an electrochemical capacitor is proportional to both the system's capacitance (C) and the square of voltage (U).

However, the use of an organic electrolyte in an electrochemical capacitor implies higher costs, due to the cost of the electrolyte itself and to the fact that the modules forming the capacitor must be built in moisture-free atmosphere. Indeed, water limits the efficiency, the cycle life and the maximum operating voltage of such capacitor.

Moreover, organic solvents are environment unfriendly in comparison to the aqueous ones. The method for manipulating such organic electrolyte is costly for industry.

A second type of electrolyte is an aqueous electrolyte. An aqueous electrolyte means an electrolyte wherein the solvent is water.

The aqueous electrolyte has the advantage of providing pseudo-capacitance as well as electrical double-layer capacitance. With carbon electrodes, the pseudo-capacitive contribution is due to redox processes involving either surface functionalities or electrochemical hydrogen storage.

Aqueous electrolytes have also a higher conductivity than the organic ones. For example, the conductivity of a 1 mol·l$^{-1}$ H$_2$SO$_4$ solution is about 1 S·cm$^{-1}$, whereas the conductivity of a typical organic electrolyte is about 0.05 S·cm$^{-1}$. The series resistance (R$_S$) corresponding to the sum of all the resistances imposed by the elements forming the capacitor is therefore lower with an aqueous electrolyte than with an organic one. The contribution of the series resistance generally involves a higher power output in the presence of an aqueous electrolyte than in the presence of an organic electrolyte, as shown by the following formula:

$$P = \frac{U^2}{4 * R_s} \qquad \text{(equation 2)}$$

wherein the power (P) output by the capacitor is proportional to the square of voltage (U) but inversely proportional to the series resistance (R$_S$).

Nevertheless, the practical values for the maximum voltage obtained with aqueous electrolytes are typically lower than 1 V and thus lower than the maximum voltage obtained with organic electrolytes.

Recently, it has been built a capacitor with high maximum voltage values, namely 1.6 V, the capacitor comprising an aqueous electrolyte with H$_2$SO$_4$ and two different activated carbon, also called AC, electrodes in an asymmetric configuration. However, despite the advantage of such a capacitor, strong acidic medium remains difficult to use for industry due to the highly corrosive feature of the electrolyte. This feature raises a problem for finding cheap and efficient current collectors and cans.

Therefore, there is a need to provide a cheap and efficient capacitor, namely delivering high power and energy.

There is also a need to provide a capacitor which is environmentally friendly and easy to manipulate by a user.

SUMMARY

According to a first aspect, the present disclosure relates to an electrochemical capacitor comprising:
  a first electrode intended for being connected to a positive terminal of a power source during the charge of the electrochemical capacitor;
  a second electrode intended for being connected to a negative terminal of a power source during the charge of the electrochemical capacitor, each electrode comprising a carbon material; and
  a porous separator intended to separate the first and second electrodes and impregnated with an almost neutral aqueous electrolyte situated between the two electrodes, the aqueous electrolyte comprising a salt formed by a metallic cation and an anion.

By "almost neutral aqueous electrolyte", we refer to an aqueous electrolyte which has a pH between 5 and 9, between 6 and 8 or around or equal to 7. "Neutral" is therefore a wording equivalent to "neutral pH".

Advantageously, using carbon based electrodes with an almost neutral aqueous electrolyte comprising a salt with a metallic cation enables a maximum voltage higher than 1 V. 1 V is the maximum value obtained with other aqueous electrolytes. A possible explanation may be the important over-potential of dihydrogen evolution for the negative carbon based electrode in such medium. The electrochemical capacitor of the present disclosure also enables high energy density with fast charge/discharge characteristics. Both electrode materials seem to store the electrochemical charges by charging/discharging the double-layer and through redox reactions of pseudocapacitive nature.

Furthermore, the capacitor of the present disclosure shows high reversibility and long cycle life.

The present disclosure also provides a capacitor with low cost and environment friendly electrodes and electrolyte which can be manipulated easily by industry.

According to further forms of the present disclosure, the electrochemical capacitor may comprise the following features alone or in combination:
- the cation is selected among elements of groups I and II of Mendeleev table, excluding hydrogen, radium and francium;
- the first electrode is substantially identical to the second electrode;
- the first electrode is different from the second electrode;
- the first and the second electrodes are made of different materials;
- the first electrode is made of a carbon material more oxidized than the carbon material of the second electrode;
- the mass of the first electrode and the mass of the second electrode are substantially equal;
- the mass of the first electrode is superior to the mass of the second electrode, in particular about 1.5 times greater than the mass of the second electrode;
- the aqueous electrolyte has a pH between 5 and 9;
- the aqueous electrolyte comprises as salt $Li_2SO_4$, $Na_2SO_4$, $K_2SO_4$, $Rb_2SO_4$, $Cs_2SO_4$, $MgSO_4$, $LiNO_3$, $NaNO_3$, $KNO_3$, $RbNO_3$, $CsNO_3$, $Mg(NO_3)_2$;
- the concentration of the salt is between 0.1 $mol \cdot l^{-1}$ and 5 $mol \cdot l^{-1}$;
- both electrodes comprise a nano-scale textured carbon material, in particular activated carbon;
- the electrochemical capacitor is connected to at least one battery or fuel cell or engine.

According to a second aspect, the present disclosure relates to an electrochemical capacitor assembly comprising a plurality of electrochemical capacitors according to the present disclosure, connected to each other in series and/or in parallel.

The present disclosure also relates to an electrical circuit comprising at least one electrochemical capacitor according to the present disclosure. The electrical circuit may also comprise a system connected to the terminals of the capacitor which uses the energy stored in the said capacitor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The electrochemical capacitor of the present disclosure thus comprises:
  a first electrode intended for being connected to a positive terminal of a power source during the charge of the electrochemical capacitor;
  a second electrode intended for being connected to a negative terminal of a power source during the charge of the electrochemical capacitor, each electrode comprising a carbon material; and
  a porous separator intended to separate the first and second electrodes and impregnated with an almost neutral aqueous electrolyte situated between the two electrodes, the aqueous electrolyte comprising a salt formed by a metallic cation and an anion.

Both electrode materials seem to store the electrochemical charges by charging/discharging the double-layer and through redox reactions of pseudo-capacitive nature. The almost neutral aqueous electrolyte, with the salt being a metallic cation and an anion, associated with carbon based electrodes enables a high voltage, high energy density with fast charge/discharge characteristics. A possible explanation may be the important overpotential of dihydrogen evolution at the negative electrode in such electrolyte.

Furthermore, the capacitor of the present disclosure shows high reversibility and long cycle life.

An aqueous electrolyte associated to an almost neutral pH and carbon electrodes enables a cheap and environment friendly capacitor. The capacitor of the present disclosure can thus be manipulated easily by any user.

In operation, the capacitor is connected either to an electric power source in order to charge the capacitor, or to a system using the energy delivered by discharge of the capacitor.

While charging the capacitor, the first electrode is connected to the positive terminal of the electric power source and is usually called the "positive electrode". The second electrode is connected to the negative terminal and is usually called the "negative electrode". While discharging the capacitor, the capacitor is connected to the supplied system to which it delivers an electric current.

Both electrodes are made of a material comprising carbon. According to a preferred form, the first electrode and/or the second electrode comprise a nano-scale textured carbon material. A nano-scale textured carbon material is a carbon material being textured at nanometric scale. Examples of such nano-scale textured carbons may be biopolymer carbon, seaweed carbon, carbide derived carbon and preferably activated carbon.

Activated carbon or AC is a relatively inexpensive material and has the advantage of reducing the electrode production costs.

The carbon may be treated or not. The treatment consists typically in oxidising or reducing the carbon material. An untreated carbon may be chosen for example from among the activated carbons such as SUPER 50® produced by Norit, Maxsorb® produced by Kansai and MWV-E510A® produced by Mead Westvaco.

Untreated activated carbon materials generally have an oxygen atom content of at most 5%. Untreated activated carbons, generally contain less than 2% of nitrogen, sulphur and/or phosphorus atoms. In the case of MWV-E510A® untreated activated carbon, the carbon comprises about 2.5% of oxygen atoms.

The first and the second electrodes may be identical. In this case, the system is called a symmetric capacitor. Using an almost neutral aqueous electrolyte enables to reach a maximum voltage of 1.6 V, while lower values are reached with basic (e.g., KOH) and acid (e.g., $H_2SO_4$) electrolytes.

The first electrode may be different from the second electrode. In this case, the system is called an asymmetric capacitor. This enables an increase of the maximum voltage window, for example up to 1.9 V.

The first and the second electrodes may be made of a different mass or/and of different material.

The first electrode may be made of a carbon material more oxidized than the carbon material of the second electrode. For example, the first electrode may have a carbon material with about 2.5% of oxygen atoms and the second electrode may have a carbon material with about 1% of oxygen atoms. The mass of the first electrode may be between once and twice, preferably about 1.5 times, greater than the mass of the second electrode. The optimal mass ratio depends on the nature of the carbons used for the first and the second electrodes.

By modifying the mass ratio $R=m_+/m_-$ between the two electrodes, only one activated carbon may be used to prepare the capacitor.

Electrodes of same thickness but with different carbon material enable advantageously an easier production of the capacitor. Indeed, a method for producing the capacitor is to roll up the first and the second electrodes together with a porous separator between the electrodes.

The porous separator is configured to separate the first and the second electrodes, which prevents short circuit. The separator may be a membrane, such as a glass microfiber paper about 0.18 mm thick marketed by Fischer Bioblock, France, cellulose paper or polypropylene.

The aqueous electrolyte has typically a pH between 5 and 9, between 6 and 8, and in particular around 7.

The said electrolyte comprises a salt formed by a metallic cation which may be coming from an element belonging to the groups I and II in the Mendeleev table.

The metallic cation of the present disclosure may be selected from the list consisting of alkali metals such as lithium, sodium, potassium, rubidium, caesium, and alkaline earth metals such as beryllium, magnesium, calcium, strontium, barium. Cation examples may be $Na^+$, $Li^+$, $K^+$, $Mg^{2+}$. In a preferred form, the aqueous electrolyte comprises as salt $Li_2SO_4$, $Na_2SO_4$, $K_2SO_4$, $Rb_2SO_4$, $Cs_2SO_4$, $MgSO_4$, $LiNO_3$, $NaNO_3$, $KNO_3$, $RbNO_3$, $CsNO_3$, $Mg(NO_3)_2$.

The concentration of the salt typically depends on the solubility of the said salt and on the maximum conductivity of the electrolyte. The concentration may be advantageously between 0.1 $mol \cdot l^{-1}$ and 5 $mol \cdot l^{-1}$.

Hereafter, the wording "two-electrode cell" made by a first electrode and a second electrode is equivalent to an electrochemical capacitor made by a first electrode and a second electrode. A three-electrode cell implies a cell with a reference electrode for measuring the potential of the working electrode. Typically, a three-electrode cell implies a cell with an investigated carbon as working electrode, a graphite rod as counter electrode and $Hg/Hg_2SO_4$ as reference electrode.

Figure 1:
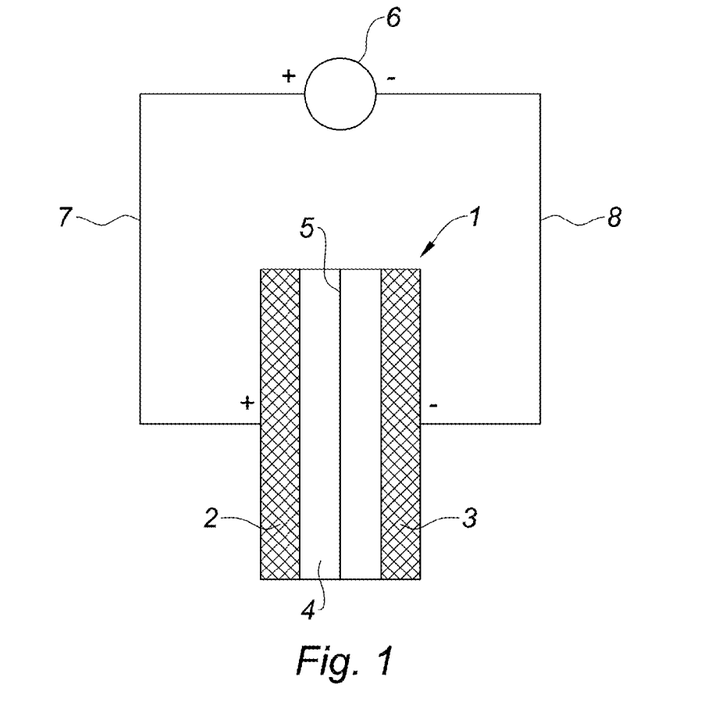
FIG. 1 is a diagram of an electrochemical capacitor according to the present disclosure while charging the electrochemical capacitor.

FIG. 1 shows a capacitor according to the present disclosure during charging. Said capacitor 1 comprises a first electrode 2 of activated carbon and a second electrode 3 of activated carbon. The two activated carbons may have been treated, for example by an oxidation with $H_2O_2$ or by a heat treatment at a temperature between 400° C. and 1,050° C. Said two electrodes 2 and 3 are arranged so as to face each other and are separated by a space filled with an almost neutral aqueous electrolyte 4 made up of an aqueous solution with about 0.5 $mol \cdot l^{-1}$ $Na_2SO_4$.

A porous separator 5 of about 0.18 mm thick glass microfibre paper, commercialized by Fischer Bioblock, is arranged in the electrolyte 4 between the two electrodes 2 and 3 and separates the space containing the electrolyte 4 into two compartments.

While charging the capacitor, the first electrode 2 is connected to the positive pole of an electric power source 6 by means of a conducting wire 7. The second electrode 3 is connected to the negative pole of the source 6 by means of another conducting wire 8. Therefore, the first electrode 2 corresponds to a positive electrode and the second electrode 3 to a negative one.

Figure 2:
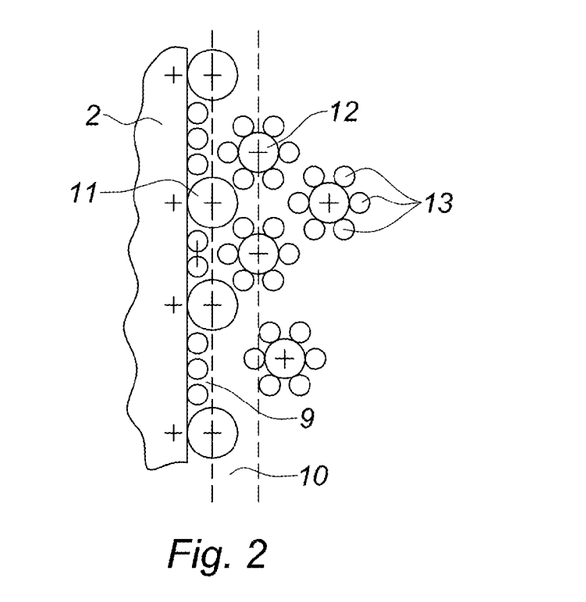
FIG. 2 is a diagram illustrating the electrical double-layer.

The charges are stored by two processes. The first process, shown in FIG. 2, corresponds to the electrostatic charge separation phenomenon. FIG. 2 shows specifically the first electrode 2 connected to the positive terminal of the source 6. During the passage of electric current, a layer 9 comprising the anions 11 is formed in the electrolyte 4 at the interface with the positively polarised surface of the electrode 2. A second layer 10 is formed on said first layer 9 in the electrolyte 4. The second layer 10 comprises cations 12 which are solvated by the solvent 13 of the electrolyte. Said cations 12 therefore migrate to the negatively polarised negative electrode 3. In parallel to this charge storage phenomenon, redox reactions also take place at the interface of each electrode 2 and 3 causing general intervention of the quinone/hydroquinone groups in the case of the oxygenated functionalities and the pairs $>C=NH/>CH-NH_2$ and $>C-NHOH/>C-NH_2$ for the nitrogenated functionalities.

An Example of a Symmetric Capacitor Using an Electrolyte Comprising $Na_2SO_4$ According to the Present Disclosure Preparation of the Sample and Equipment Used The electrodes are manufactured with a capacitor grade commercial activated carbon (AC) provided by MeadWestvaco (USA). Pellets of about 1 cm diameter, of a thickness between 250 μm and 350 μm and of a mass between 8 mg and 10 mg are prepared by pressing a homogeneous mixture of about 80 wt % of activated carbon, about 10 wt % of acetylene black (Pure Black, Superior Graphite Co., USA) and about 10 wt % of PVDF (polyvinylidene difluoride) as binder.

The symmetric AC/AC electrodes capacitor is studied using teflon Swagelok® type two-electrode cells which are built with gold current collectors and glassy fibrous separator. A special two-electrode cell equipped with a reference electrode ($Hg/Hg_2SO_4$) called SME is also used.

For the experiments carried out in a three-electrode cell, the auxiliary electrode is a graphite rod and the reference electrode is the SME. All potential values are further expressed versus the normal hydrogen electrode (NHE). Cyclic voltammetry is recorded at a scan rate of about 2 $mV \cdot s^{-1}$ using a VMP (Biologic, France) multichannel potentiostat/galvanostat.

Galvanostatic charge/discharge experiments are realized in about 0.5 $mol \cdot l^{-1}$ of $Na_2SO_4$ aqueous electrolyte and using a VMP (Biologic) multichannel potentiostat/galvanostat.

All the experiments are realized in a deaerated electrolyte in order to avoid side reactions between the carbon based electrodes and di-oxygen which could be dissolved in the solution.

Results

The AC material exhibits a high purity and a specific surface area of about 2250 $m^2 \cdot g^{-1}$. The atomic percentage of oxygen determined by the XPS method is about 2.5%.

Figure 3:
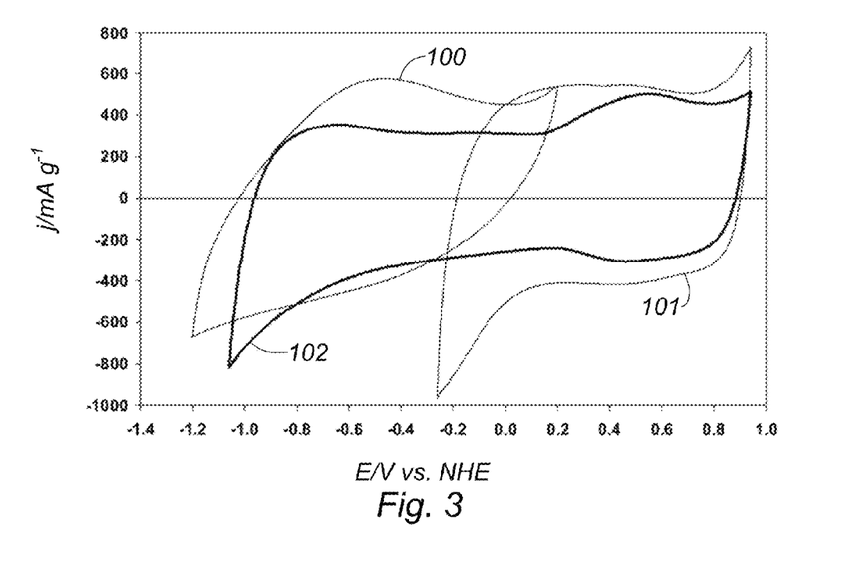
FIG. 3 are cyclic voltammograms recorded at 2 $mV \cdot s^{-1}$ in a three-electrode cell, showing the potential stability window of an AC electrode used in the present disclosure in solution with about 6 $mol \cdot l^{-1}$ of KOH (reference 100), about 1 $mol \cdot l^{-1}$ of $H_2SO_4$ (reference 101) and about 0.5 $mol \cdot l^{-1}$ of $Na_2SO_4$ (reference 102)

FIG. 3 shows the cyclic voltammograms (CV) of AC electrodes in a three-electrode cell with about 1 $mol \cdot l^{-1}$ of $H_2SO_4$ (reference 101), about 6 $mol \cdot l^{-1}$ of KOH (reference 100) and about 0.5 $mol \cdot l^{-1}$ of $Na_2SO_4$ (reference 102), respectively. The stability potential window is about twice larger in the almost neutral aqueous electrolyte with $Na_2SO_4$ (reference 102) than in the acidic or the basic electrolyte (references 100 and 101).

In the almost neutral aqueous electrolyte, the potential window shown by reference 102 is about 2 V and may be due to the high over-potential for dihydrogen evolution, e.g., 0.6 V. This over-potential is related to the storage of nascent hydrogen in negative AC electrodes at potentials below the thermodynamic potential value for water reduction, e.g., −0.38 V vs. NHE in the aqueous electrolyte with about 0.5 mol·l$^{-1}$ of Na$_2$SO$_4$.

The hump observed at about 0.55 V during the anodic scan (see FIG. 3) may be related to the electro-oxidation of the hydrogen sorbed in the AC.

Figure 4A:
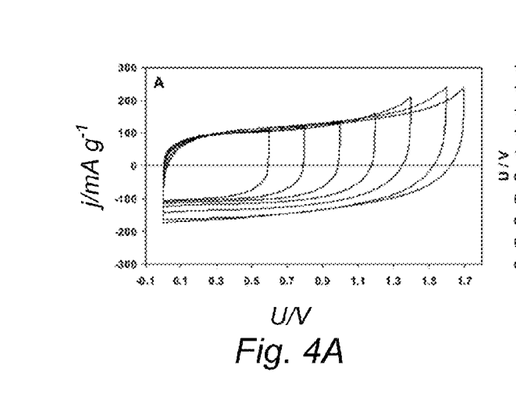
FIG. 4A are cyclic voltammograms at 2 $mV \cdot s^{-1}$ and FIG. 4B are galvanostatic charge and discharge curves at plus or minus 200 $mA \cdot g^{-1}$, each being recorded for a symmetric AC/AC electrodes capacitor of the present disclosure operating in an almost neutral aqueous electrolyte with $Na_2SO_4$ of 0.5 $mol \cdot l^{-1}$ at different maximum voltage values.
Figure 4B:
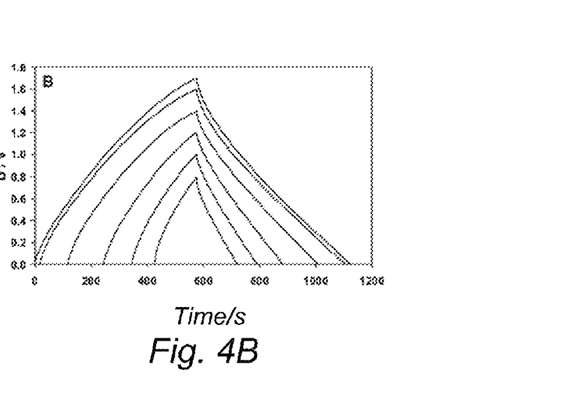

The cyclic voltammogramms (CVs) and the galvanostatic charge and discharge curves of a symmetric AC/AC electrodes capacitor in Na$_2$SO$_4$ are presented in FIGS. 4A and 4B, respectively. For low values of maximum voltage, the CVs (FIG. 4A) exhibit a rectangular shape characteristic of a pure capacitive behaviour. When the maximum cell voltage increases, a current increase appears, which may be due to redox reactions taking place at the first, in this case positive, and/or the second, in this case negative, electrode. Galvanostatic charge/discharge cycles (FIG. 4B) recorded for small voltage windows show symmetric characteristics, which may be due to a pure capacitive behaviour, while some distortions related with the redox processes appear during the first cycles when the maximum voltage increases. After few hundred cycles, the voltage versus time curves become linear.

These results suggest that the symmetric AC/AC electrodes capacitor should be able to operate up to about 1.6 V with a specific capacitance ($C_S$) of about 135 F·g$^{-1}$, determined following equation (3):

$$Cs = \frac{4*C}{M} \quad \text{(equation 3)}$$

with C the capacitance calculated from galvanostatic discharge curves of the system and M the mass of the positive and negative electrodes.

Figure 5:
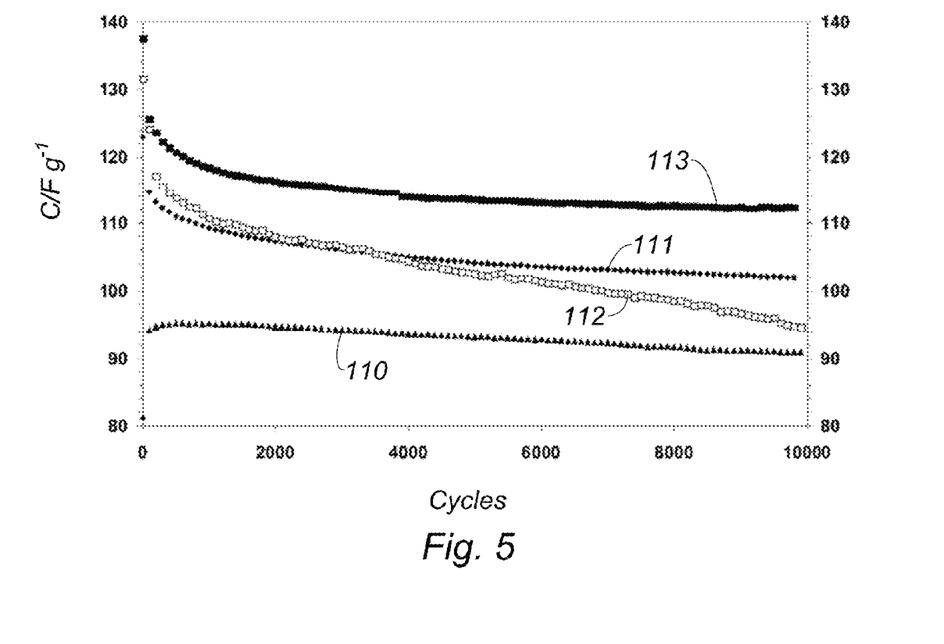
FIG. 5 is a plot of the specific discharge capacitance of a symmetric AC/AC electrodes capacitor of the present disclosure during cycling at a current density of about plus or minus 1 $A \cdot g^{-1}$ in an almost neutral aqueous electrolyte with 0.5 $mol \cdot l^{-1}$ of $Na_2SO_4$ for a maximum voltage of 1 V (reference 110), 1.4 V (reference 111), 1.7 V (reference 112), 1.6 V (reference 113)

The result of galvanostatic charge/discharge cycling of the symmetric AC/AC electrodes capacitor in Na$_2$SO$_4$ at different values of maximum voltage is presented in FIG. 5. Typically for a system with a pseudo-capacitive contribution, the capacitance increases when the maximum voltage increases from 1 V to 1.6 V.

FIG. 5 also shows the possibility of operating up to 1.6 V when using this electrolyte. In fact, at about 1.6 V, the capacitance slightly decreases by about 7% during the first 2,000 cycles, and it becomes almost constant at around 110 F·g$^{-1}$ up to 10,000 cycles. However, if the maximum voltage is increased up to about 1.7 V, the capacitance continuously decreases.

The energy density which can be extracted from the symmetric capacitor in the aqueous electrolyte with Na$_2$SO$_4$ is around 14 Wh·kg$^{-1}$, considering the mass of both electrodes, at a current density of about plus or minus 1 A·g$^{-1}$, while the maximum value obtained for the same configuration in a basic aqueous electrolyte with KOH is about 5.4 Wh·kg$^{-1}$.

When using a KOH aqueous solution, the capacitance values are slightly higher than the one in an almost neutral aqueous electrolyte with Na$_2$SO$_4$, but the maximum operating voltage for a reversible cycling is only about 1 V.

In another experiment, a special two-electrode cell equipped with a reference electrode in an almost neutral aqueous electrolyte with 0.5 mol·l$^{-1}$ of Na$_2$SO$_4$ is built. Such configuration allows the first, namely positive, and second, namely negative, electrode potentials to be recorded separately during the capacitor charge/discharge between zero and a given maximum voltage.

Figure 6:
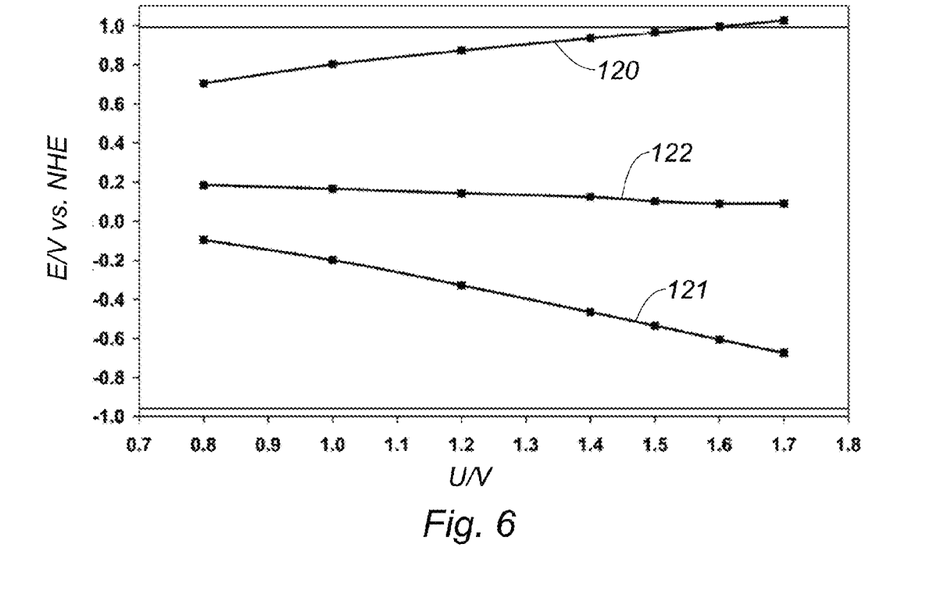
FIG. 6 is a diagram showing the potential reached by the first electrode (reference 120) and the second electrode (reference 121) and the potential at a voltage equal to about 0V, called hereafter "$E_{0V}$", (reference 122) during the operation of a two-electrode cell, equipped with a reference electrode, at different values of maximum operating voltage with an electrolyte of 0.5 $mol \cdot l^{-1}$ $Na_2SO_4$.

According to FIG. 6, if the capacitor is charged between 0 V and the maximum stability voltage of about 1.6 V, the operating potential windows for the negative and the positive electrode are between 0.09 V vs. NHE and −0.61 V vs. NHE as well as between 0.09 V vs. NHE and 0.99 V vs. NHE, respectively.

According to FIG. 3, the lowest potential for a negative electrode in an almost neutral aqueous electrolyte with Na$_2$SO$_4$ before dihydrogen production is around −0.95 V vs. NHE and the highest one for a positive electrode in order to avoid an irreversible oxidation is around 0.99 V vs. NHE (see the horizontal lines included in FIG. 6).

Hence, FIG. 6 shows that the maximum voltage of the capacitor is limited by the positive electrode. In fact, the maximum potential reached by the positive electrode at a maximum cell voltage of about 1.6 V is already slightly beyond the limit, whereas the minimum potential reached by the negative electrode is far from the limit imposed by gas evolution.

Figure 7:
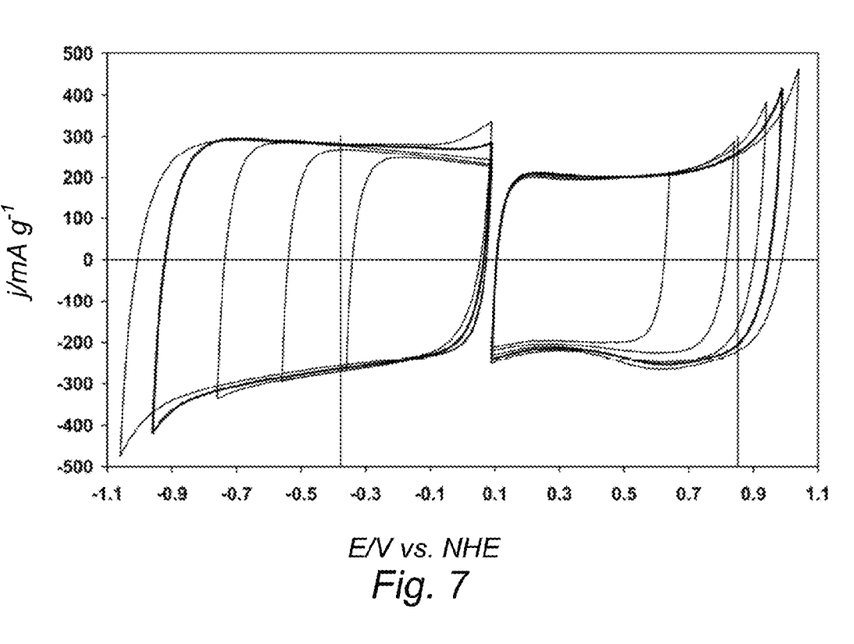
FIG. 7 are cyclic voltammograms of AC recorded separately in a three-electrode cell in an almost neutral aqueous electrolyte with 0.5 $mol \cdot l^{-1}$ of $Na_2SO_4$ within different potential ranges from the $E_{0V}$ down to smaller potentials or up to higher ones, $E_{0V}$ being the potential measured for U equal to 0.

FIG. 7 shows CVs recorded separately for AC in a three-electrode cell for different potential windows, going from the above determined electrodes potential at U=0 V, $E_{OV}$=0.09 V vs. NHE (see FIG. 6), down to smaller potentials or up to higher ones.

From $E_{OV}$, namely the electrode potential when the operating voltage U being equal to 0V, down to smaller potentials, values smaller than the potential limit for water decomposition at around −0.38 V vs. NHE are reached with a slight increase of current related with hydrogen sorption. The minimum value of about −0.95 V before dihydrogen evolution is more negative than the limit of about −0.61 V vs. NHE observed for the negative electrode in FIG. 6. The possible potential range is not completely used for the negative electrode at a cell voltage of about 1.6 V.

In FIG. 7, from $E_{OV}$ up to higher potential values, an anodic current leap together with a corresponding cathodic wave at about 0.65 V appears when the potential for oxygen evolution is surpassed.

Such peaks are related to the electrochemical oxidation of the carbon electrode and to the redox reactions between the electrolyte and the oxygenated surface functionalities thereof generated. Since the maximum potential of the positive electrode is about 0.99 V vs. NHE, at a maximum voltage of about 1.6 V, an electrochemical oxidation seems to take place at the positive electrode.

Since the system can be reversibly charged and discharged up to 10,000 cycles with only 7% capacitance loss (see FIG. 5), such oxidation is apparently not deleterious for the positive electrode. However, when the maximum voltage is increased up to about 1.7 V, the maximum potential of the positive electrode becomes too high and some irreversible oxidation processes lead to a poor cyclability of the system (FIG. 5).

Examples of Asymmetric Electrodes Capacitor Comprising an Electrolyte with Na$_2$SO$_4$ According to the Present Disclosure Preparation of the Sample and Equipment Used A high purity activated carbon is annealed at about 900° C. during about 2 hours in N$_2$ atmosphere. Such a material is called hereafter as "AC900".

The activated carbon material which is not treated is called hereafter "AC".

The porous texture of the two carbon materials is analysed by nitrogen and $CO_2$ adsorption at 77 K and 273 K, respectively. Before the analysis, the samples are degassed overnight at about 200° C.

The specific surface area is calculated from the $N_2$ adsorption isotherm by applying the BET equation.

The micropore volume is calculated from the application of the Dubinin-Radushkevich equation to the $N_2$ adsorption data for the ratio $P/P_0$ inferior or equal to about 0.015, where P is the measured pressure and $P_0$ is the $N_2$ saturation pressure at about 77 K.

The ultramicropore volume is calculated by applying the Dubinin-Radushkevich equation to the $CO_2$ adsorption isotherm.

The pore size distribution is obtained from the $N_2$ adsorption data by applying the non-linear differential functional theory (NL-DFT).

X-ray photoelectron spectra (XPS) are recorded on the powder with a VG ESCALAB 250 spectrometer using an Al-Kα monochromatic source, working at about 15 kV and about 15 mA, and a multidetection analyzer, under about $10^{-8}$ Pa residual pressure.

Pellets of about 1 cm diameter, of a thickness between 250 μm and 350 μm and of a mass between 8 mg and 10 mg are prepared by pressing a homogeneous mixture of 80 wt % of activated carbon, 10 wt % of acetylene black and 10 wt % of PVDF (polyvinylidene difluoride) as binder. Each pellet is dried at about 120° C. overnight.

The two-electrode cells are assembled using a Teflon Swagelok® construction with gold current collectors and glassy fibrous separator. A special two-electrode cell equipped with a $Hg/Hg_2SO_4$ reference electrode (SME) is also used in order to determine the potential window of each electrode during cycling the supercapacitor.

For three-electrode cell experiments, the auxiliary electrode is a graphite rod and SME is the reference electrode. The two-electrode cells are built with a deaerated electrolyte comprising 0.5 $mol \cdot l^{-1}$ of $Na_2SO_4$. All potentials are further expressed versus the normal hydrogen electrode (NHE).

A VMP2 (Biologic, France) multichannel potentiostat/galvanostat is used for cyclic voltammetry at a scan rate of about 2 $mV \cdot s^{-1}$ and galvanostatic charge/discharge cycling.

Characterization of the Activated Carbons

The nitrogen adsorption isotherm of AC and the pore size distribution are characteristic of a microporous material with some amount of mesopores favourable for ions transportation.

For AC900, the adsorption isotherm and the pore size distribution are similar to the one observed for AC. The data extracted from the isotherms of AC and AC900 seem to demonstrate a well-developed porosity (see table 1).

TABLE 1

Specific surface area, pore volume data and $O_{1s}$ data from XPS for AC and AC900.

| | $S_{BET}$ $m^2 \cdot g^{-1}$ | $V_{ultramicro}$ ($CO_2$) $cm^3 \cdot g^{-1}$ | $V_{micro}$ ($N_2$) $cm^3 \cdot g^{-1}$ | $V_{meso}$ $cm^3 \cdot g^{-1}$ | $O_{1s}$ at. % |
|---|---|---|---|---|---|
| AC | 2244 | 0.83 | 0.79 | 0.45 | 2.5 |
| AC900 | 2276 | 0.82 | 0.79 | 0.51 | 1 |

Beside carbon, oxygen is the only element detected by XPS on the surface of ACs used as received. The main difference between the two carbons is the amount of oxygen, which is lower after annealing at around 900° C. with 1 at %, as the heat treatment cleaned the surface from most of the oxygenated functionalities.

Figure 8A:
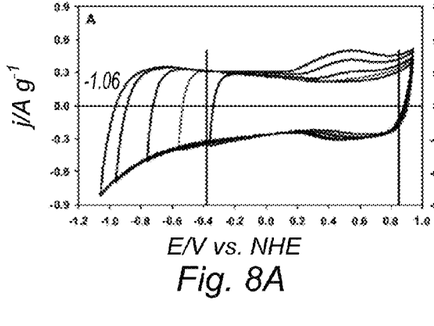
FIG. 8A are three-electrode cyclic voltammograms of an AC electrode used in the present disclosure in an almost neutral aqueous electrolyte with $Na_2SO_4$ of 0.5 $mol \cdot l^{-1}$ at five different negative cut-off potentials and a scan rate of 2 $mV \cdot s^{-1}$.
Figure 8B:
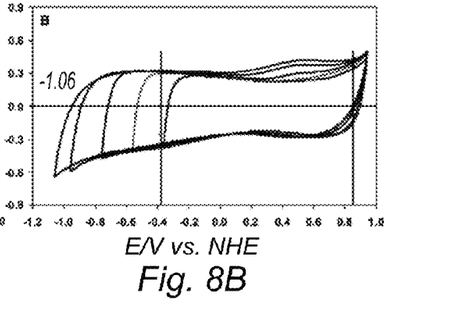
FIG. 8B are three-electrode cyclic voltammograms of an AC900 electrode, in the same condition as the one of FIG. 8A and wherein AC900 is the AC treated at around 900° C. in an inert atmosphere.

FIGS. 8A and 8B presents the cyclic voltammograms (CVs) recorded in three-electrode cells for AC (FIG. 8A) and AC900 (FIG. 8B) at different negative cut-off potentials in a deaerated electrolyte with about 0.5 $mol \cdot l^{-1}$ of $Na_2SO_4$ at a scan rate of about 2 $mV \cdot s^{-1}$. The vertical lines at about −0.38 V vs. NHE and at about 0.85 V vs. NHE correspond to the negative and positive potentials for water decomposition, respectively. In FIG. 8A, the CV obtained for the smallest potential window, when the negative limit is higher than the theoretical potential for water reduction, is quite rectangular, indicating a pure capacitive behaviour.

When the negative potential limit reaches lower values than the theoretical limit for water electroreduction during the negative scan, an oxidation peak appears during the positive scan at around 0.55 V vs. NHE and corresponds to the oxidation of reversibly stored hydrogen at lower potentials.

As illustrated in FIG. 8B, the shape of CVs recorded for an AC900 electrode is quite similar to that of an AC electrode.

However, the oxidation wave is less important, suggesting a smaller amount of stored hydrogen.

The AC900 electrode presents approximately the same wide stability potential window as the AC electrode, i.e. about 2 V, when using $Na_2SO_4$ as a salt in the aqueous electrolyte.

Figure 9:
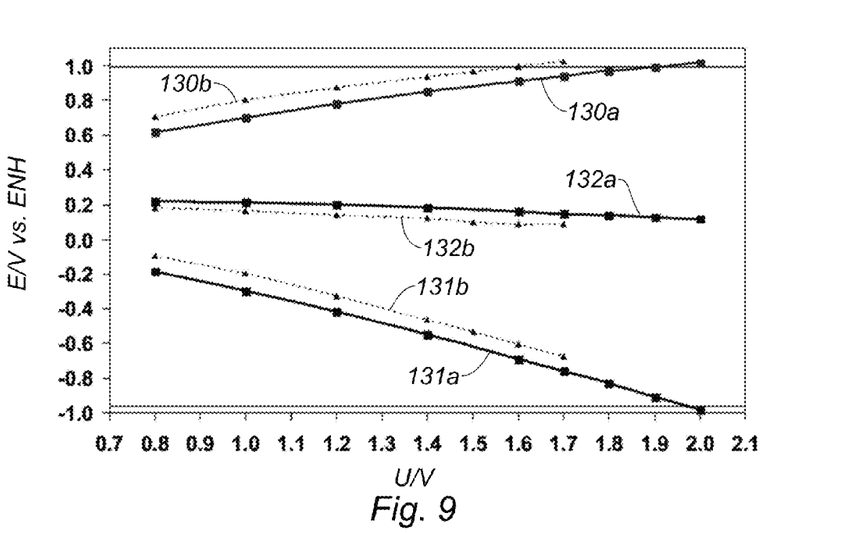
FIG. 9 is a plot showing the potential reached by the first electrode (reference 130), the second electrode (reference 131) and the potential $E_{0V}$ (reference 132) during the operation of:
- an asymmetric AC/AC electrodes capacitor of the present disclosure where the mass ratio R between the first and the second electrodes is substantially equal to 1.5 (references 130a, 131a, 132a); and
- a symmetric AC/AC electrodes capacitor of the present disclosure with a mass ratio R substantially equal to 1 (references 130b, 131b, 132b), said capacitors being equipped with a reference electrode and with an electrolyte comprising 0.5 $mol \cdot l^{-1}$ of $Na_2SO_4$.

Asymmetric Capacitor Comprising an Electrolyte with $Na_2SO_4$ and Electrodes of Different Mass According to the Present Disclosure FIG. 9 shows the results of experiments carried out in special two-electrode cells, equipped with a reference electrode, constructed from electrodes based on AC for a symmetric cell and for an asymmetric cell with electrodes of mass ratio R equal to about 1.5 in an aqueous deaerated electrolyte with about 0.5 $mol \cdot l^{-1}$ of $Na_2SO_4$. Such configuration allows the first, namely positive, and second, namely negative, electrodes potentials to be recorded separately during the capacitor charge and discharge between zero and a given maximum voltage. The $E_{0V}$, corresponding to the electrodes potential when the cell voltage is about 0 V, is also presented.

For the symmetric configuration, the cell voltage is limited at about 1.6 V instead of around 2 V as could be expected considering the stability potential window determined in the previous section by using a three-electrode cell.

It appears that the first, namely positive, electrode limits the performances, as shown in FIG. 9, where the potential at the second, namely negative electrode for U equal to about 1.6 V, is far from the negative limit which may be estimated at about −0.95 V vs. NHE in considering the CVs of FIG. 8A. The positive limit is determined at about 0.99 V vs. NHE as it is the potential reached by the positive electrode for U equal to about 1.6 V during the operation of the symmetric special cell or capacitor. This limit may be attributed to the irreversible carbon oxidation.

The electrodes specific capacitance values are about 133 $F \cdot g^{-1}$ and 112 $F \cdot g^{-1}$ for the second, namely negative, and the first, namely positive, electrodes, respectively, and $\Delta E_+$ is about 0.9 V. In order to reach a cell voltage of 2 V, $\Delta E_-$ must be equal to about 1.1 V. Taking into account that the charges stored at the positive and at the negative electrodes are the same, the optimal mass ratio $R=m_+/m_-$ can be determined by using equation 4:

$$m_+ {}^* C_+ {}^* \Delta E_+ = m_- {}^* C_- {}^* \Delta E_-$$ (equation 4)

with $m_+$ and $m_-$ the mass, $C_+$ and $C_-$ the capacitance and $\Delta E_+$ and $\Delta E_-$ the operating potential window of the positive and negative electrodes, respectively. The optimal mass ratio R is around 1.45.

In FIG. 9, the results obtained for the asymmetric configuration indicate a larger maximum voltage of about 1.9 V, where the potential for both electrodes is near to the given limit values.

The operating potential windows are between −0.91 V vs. NHE and 0.13 V vs. NHE as well as between 0.13 V vs. NHE and 0.99 V vs. NHE for the second, namely negative, and the first, namely positive, electrodes, respectively. The $E_{0V}$ is 0.13 V vs. NHE which is close to the $E_{0V}$ of about 0.09 V vs. NHE measured for the symmetric capacitor.

Hence, the cell voltage is increased as the negative limit for the maximum operating voltage is shifted towards negative potentials and reaches values close to the negative limit previously estimated in considering gas evolution. Under the same time, the potential at the positive electrode remains close to the limit due to carbon oxidation. By contrast, when U is equal to about 2 V, the potential values are beyond the limits at both the positive and negative electrodes.

Figure 10A:
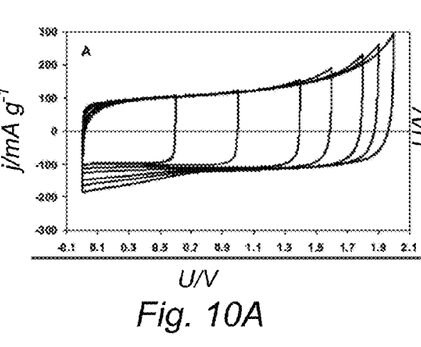
FIG. 10A are cyclic voltammograms at 2 $mV \cdot s^{-1}$ and FIG. 10B are galvanostatic charge and discharge curves at plus or minus 200 $mA \cdot g^{-1}$ both for an asymmetric AC/AC electrodes capacitor of the present disclosure with a mass ratio R equal to around 1.5 in an almost neutral aqueous electrolyte with about 0.5 $mol \cdot l^{-1}$ $Na_2SO_4$ at different maximum voltage values.
Figure 10B:
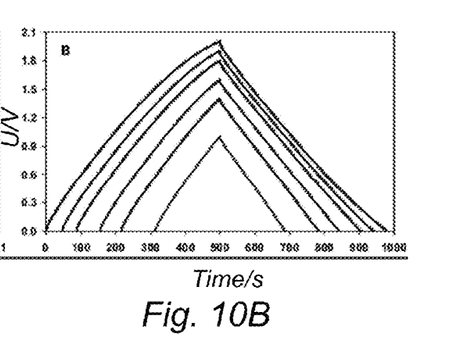

FIGS. 10A and 10B group together CVs recorded at a scan rate of about 2 mV·s$^{-1}$ (see FIG. 10A) and galvanostatic charge and discharge characteristics obtained at a current density of plus or minus 0.2 A·g$^{-1}$ (FIG. 10B) for an asymmetric capacitor equipped of electrodes based on AC with R equal to about 1.5. For a maximum voltage inferior to 1.6 V, on FIG. 10A, CVs exhibit a quasi rectangular shape, characteristic of a pure capacitive behaviour. For a maximum voltage superior or substantially equal to 1.6 V, distortions are observable, such as a current increase at higher cell voltage and its counter part at lower cell voltage during the negative sweep. When the maximum voltage is superior or equal to about 1.6 V, the potentials at the electrodes reach values where redox processes are observable, namely oxidation of carbon at the positive electrode, hydrogen storage at the negative electrode. These phenomena seem to be responsible of the distortions observed on CVs and seem to contribute to increase the specific capacitance of the system, adding a pseudocapacitive contribution to the pure capacitive one.

The galvanostatic charge and discharge characteristics presented on FIG. 10B exhibit a substantially isosceles triangle shape, particularly for lower values of maximum voltage. For a maximum operating voltage superior or equal to about 1.6 V, a small distortion is visible as the curve slope decreases at low voltage during the discharge, indicating the pseudocapacitive contribution of redox processes. Moreover, the system efficiency (η) can be determined from the results of FIG. 10B, following equation 5:

$$\eta = \frac{q_d}{q_c} = \frac{t_d}{t_c},$$ (equation 5)

where $q_d$ and $q_c$ are the total amount of discharge and charge of the capacitor, respectively, and $t_d$ and $t_c$ the time of discharge and charge of the capacitor, respectively.

For the asymmetric system, the efficiency remains superior or equal to about 97% for a maximum voltage equal to about 1.9 V.

Figure 11:
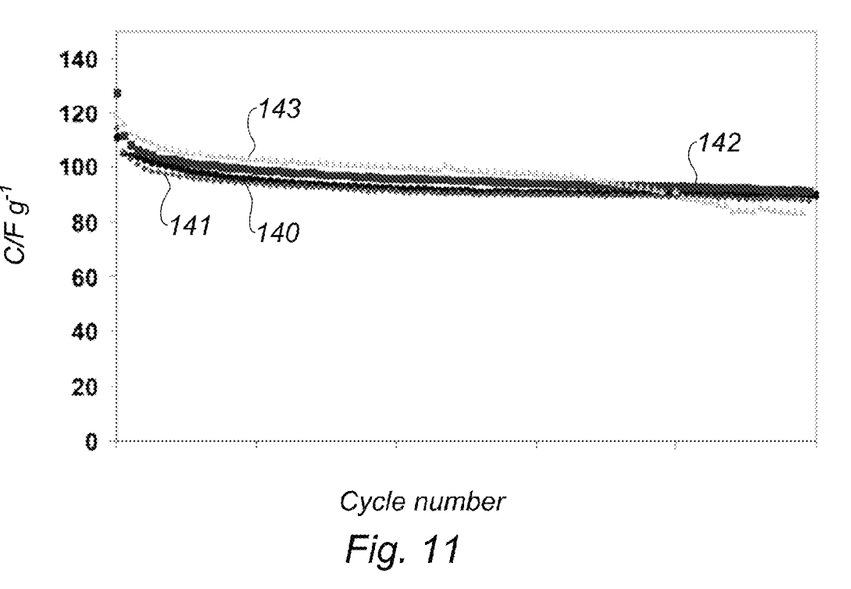
FIG. 11 is a plot showing the evolution of the specific discharge capacitance during galvanostatic charge/discharge cycles of plus or minus 1 A·g$^{-1}$ per average mass of both electrodes of an asymmetric AC/AC electrodes capacitor of the present disclosure, the mass ratio R of electrodes being substantially equal to about 1.5 and the electrolyte used being a deaerated electrolyte with $Na_2SO_4$ of about 0.5 mol·l$^{-1}$, the said capacitor working at different maximum voltages of 1.6 V (reference 140), 1.8 V (reference 141), 1.9V (reference 142), 2 V (reference 143).

Galvanostatic charge and discharge cycling is carried out at a current density of plus or minus 1 A·g$^{-1}$ on asymmetric AC/AC electrodes capacitors with R equal to about 1.5. FIG. 11 gives the specific discharge capacitance at different values of maximum voltage vs. the cycle number. The results show an excellent cyclability for U equal to about 1.9 V.

When the maximum voltage is equal to about 2 V, the electrodes operating potentials overtake the limit values (see FIG. 9) and the system cycle life drops.

Figure 12:
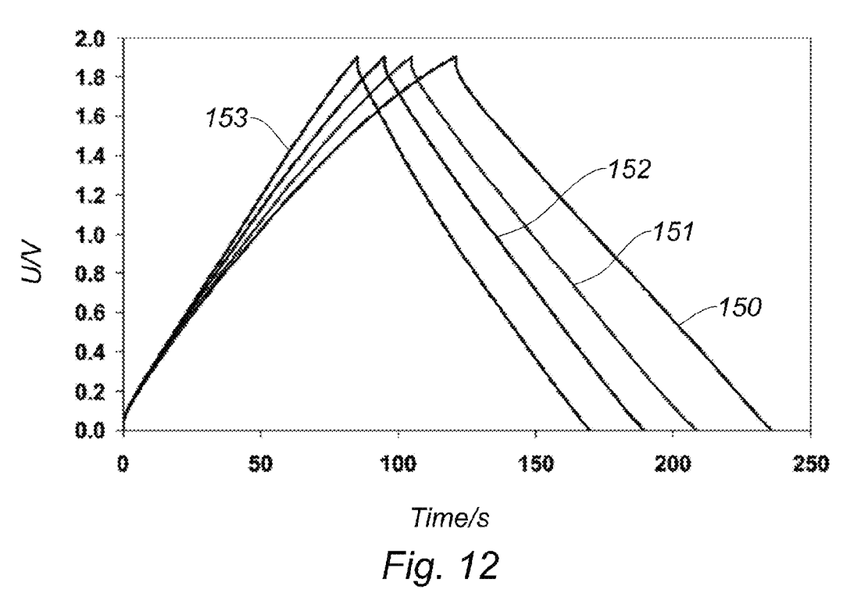
FIG. 12 is a plot showing galvanostatic charge/discharge curves of an asymmetric capacitor of the present disclosure with R equal to around 1.5 at a maximum voltage of around 1.9 V during cycling, in particular during the fifth cycle (reference 150), the hundredth cycle (reference 151), the thousandth cycle (reference 152), the ten-thousandth cycle (reference 153)

In FIG. 12 are shown charge and discharge galvanostatic curves obtained during cycling at a maximum voltage equal to about 1.9 V at a current density of plus or minus 1 A·g$^{-1}$ on the asymmetric capacitor.

On table 2 are presented the efficiency and the system specific discharge capacitance at different cycle numbers.

TABLE 2

Specific discharge capacitance and efficiency for different cycle numbers during galvanostatic charge/discharge cycles at a current density of plus or minus 1 A · g$^{-1}$ for the asymmetric system with R equal to about 1.5.

| Cycle number | C (F · g$^{-1}$) | (%) |
|---|---|---|
| 5 | 126.6 | 94.7 |
| 100 | 113.7 | 98.8 |
| 1000 | 103.3 | 99.1 |
| 10000 | 92.5 | 99.1 |

During cycling, the capacitance mainly decreases during the first 1,000 cycles, as shown in FIG. 11 and table 2, but the shape of the curves has become substantially similar to a substantially isosceles triangle (see FIG. 12) which is confirmed by the better system efficiency after hundreds of cycles, reaching more than 99% after 1,000 cycles.

Finally, the specific capacitance reaches about 92 F·g$^{-1}$ after 10,000 cycles for the maximum voltage equal to about 1.9 V, while it starts at about 126 F·g$^{-1}$ and is at about 103 F·g$^{-1}$ after 1,000 cycles. The capacitance slightly drops essentially during the first 1,000 cycles, and it remains almost constant up to 10,000 cycles.

Following equation 1, the maximum system energy density, namely $E_{max}$ calculated from the galvanostatic charge/discharge experiments at a current density of about 0.2 A·g$^{-1}$, may reach about 18 Wh·kg$^{-1}$. Then the asymmetric configuration allows increasing the system performance of about 30% in comparison to the symmetric one where $E_{max}$ is equal to about 14 Wh·kg$^{-1}$, using the same electrolyte and the same activated carbon at the electrodes.

Indeed, an asymmetric capacitor allows reaching higher maximum voltage and energy density than the symmetric one. However, the use of electrodes of high thickness remains a problem as it may drive to higher Equivalent Series Resistance (ESR). The ESR increase may lead to lower system maximum power. Moreover, for technological applications, electrodes of the same thickness are of great interest as it is easier to prepare modules.

Asymmetric Supercapacitor with Electrodes of Different Carbon Materials and of Same Mass According to the Present Disclosure FIGS. 8A and 8B suggest a lower pseudo-capacitive contribution related with hydrogen storage for an AC900 electrode than for an AC electrode under negative polarization, and consequently a lower specific capacitance for an AC900 electrode than for an AC electrode. Therefore, by comparison with an asymmetric capacitor according to the present disclosure with electrodes of same nature but different mass where the optimal mass ratio is equal to about 1.5 in order to enhance the $\Delta E_+/\Delta E_-$ ratio, the same result could be obtained with an asymmetric AC (first electrode)/AC900 (second electrode) capacitor built with R equal to about 1 which seems to be an optimal R according to equation 4.

Figure 13:
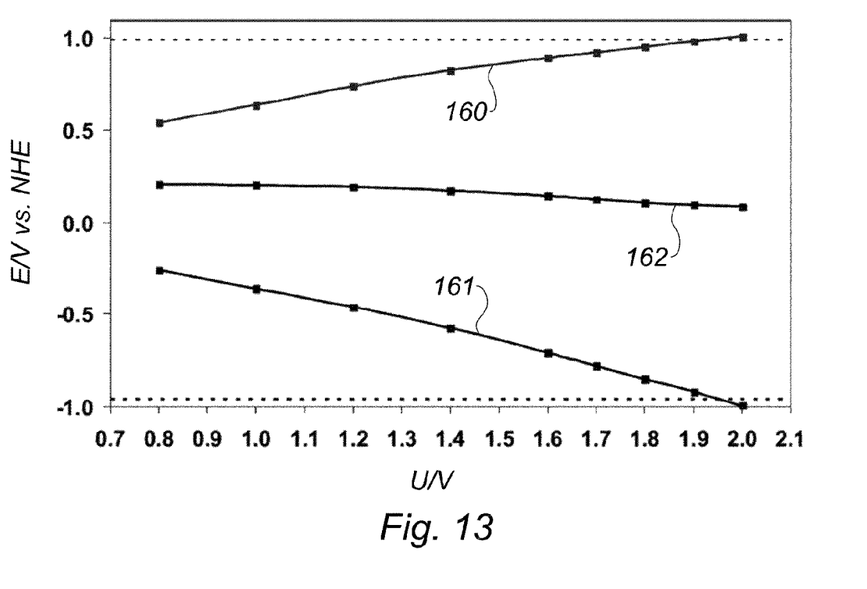
FIG. 13 is a plot showing the potential reached by the first electrode (reference 160) and the second electrode (reference 161) at different values of maximum voltage and the potential $E_{0V}$ (reference 162) at a voltage of around 0V, during the operation of an electrochemical capacitor of the present disclosure with $Na_2SO_4$ of 0.5 mol·l$^{-1}$, and the capacitor being equipped with a reference electrode and being built with an AC first electrode and with a second electrode of AC900 as well as with a R equal to about 1.

The results obtained in a special two-electrode cell equipped with a reference electrode are presented in FIG. 13 where the positive and negative operating potential limits are given.

The cell is built with AC and AC900 at the first, namely positive, and at the second, namely negative, electrodes with R equal to about 1, respectively, in a deaerated electrolyte of about 0.5 mol·l$^{-1}$ Na$_2$SO$_4$. For the maximum voltage equal to about 1.9 V, the electrodes operating potential windows of such system between −0.92 V vs. NHE and 0.1 V vs. NHE as well as between 0.1 V vs. NHE and 0.98 V vs. NHE for the second, namely negative, and the first, namely positive, electrodes, respectively, are similar to those recorded for the asymmetric system with R equal to about 1.5 and the $E_{0V}$ is at about 0.1 V vs. NHE.

Figure 14:
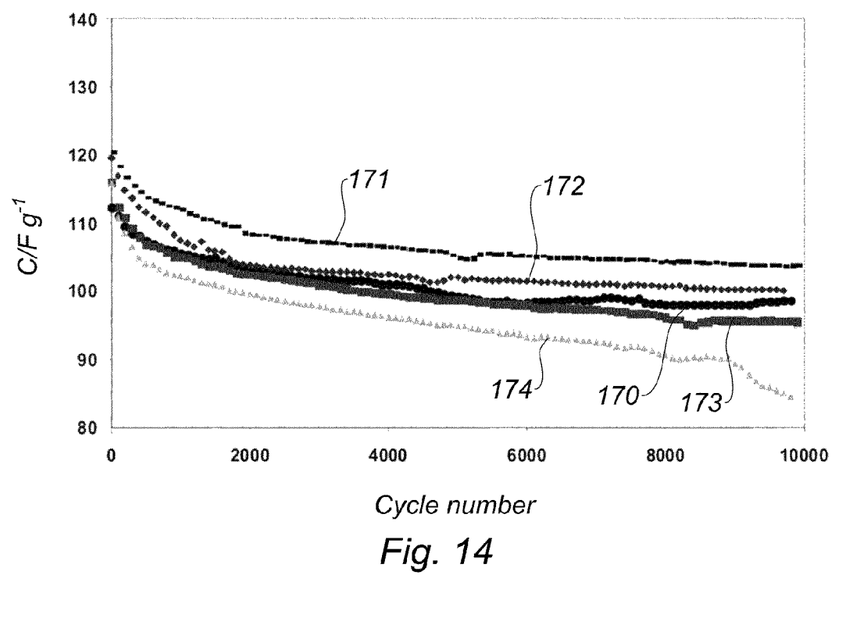
FIG. 14 is a plot showing the evolution of the specific discharge capacitance during galvanostatic cycles of plus or minus 1 A·g$^{-1}$ per average mass of both electrodes, of an AC first electrode and AC900 second electrode capacitor of the present disclosure, the mass ratio R of electrodes being equal to about 1 and the electrolyte being deaerated with $Na_2SO_4$ of 0.5 mol·l$^{-1}$, the said capacitor working at different maximum voltages of 1.6 V (reference 170), 1.7 V (reference 171), 1.8 V (reference 172), 1.9 V (reference 173), 2 V (reference 174)

FIG. 14 shows the evolution of the specific discharge capacitance during galvanostatic charge and discharge cycles recorded at different maximum voltage values under a current density of plus or minus 1 A·g$^{-1}$ for an asymmetric AC (first electrode)/AC900 (second electrode) capacitor operating in an almost neutral aqueous electrolyte with about 0.5 mol·l$^{-1}$ of Na$_2$SO$_4$. For the maximum voltage inferior or equal to about 1.9 V, the system cycle life is excellent.

In considering the results presented in FIG. 14, the system cycle life falls when the maximum voltage reaches 2 V, confirming that the electrodes potentials reach values beyond the electrolyte stability limits. At a maximum voltage of 1.9 V the capacitance slightly drops during the first 1,000 cycles and it further remains almost constant up to 10,000 cycles.

Figure 15:
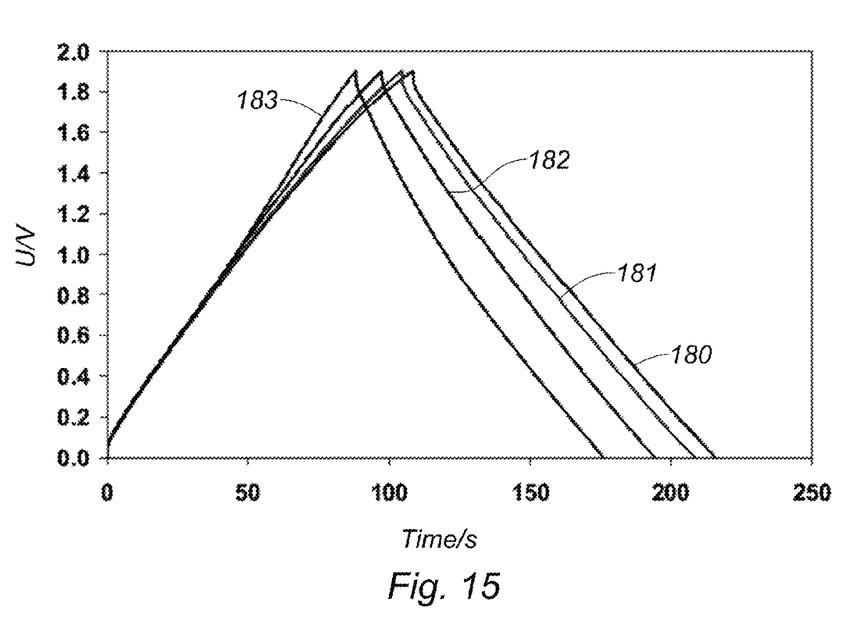
FIG. 15 is a diagram showing galvanostatic charge-discharge characteristics of a capacitor of the present disclosure with an AC first electrode and an AC900 second electrode and with a mass ratio R substantially equal to 1 at a maximum voltage of about 1.9 V during cycling, in particular during the fifth cycle (reference 180), the hundredth cycle (reference 181), the thousandth cycle (reference 182), the ten-thousandth cycle (reference 183).

Moreover FIG. 15 presents the galvanostatic charge and discharge curves recorded during cycling at the maximum voltage equal to about 1.9 V. When the cycle number increases, the shape becomes closer and closer to an isosceles triangle, indicating that some pseudocapacitive processes disappear progressively during cycling.

This result is confirmed by the efficiency values extracted from the curves of FIG. 15 and presented in table 3.

TABLE 3

Specific discharge capacitance and efficiency for different cycle numbers during galvanostatic charge/discharge cycles at a current density of plus or minus 1 A · g$^{-1}$ for the asymmetric first AC electrode and second AC900 electrode capacitor with R equal to about 1.

| Cycle number | C (F · g$^{-1}$) | η (%) |
|---|---|---|
| 5 | 118.1 | 98.9 |
| 100 | 115 | 99.5 |
| 1000 | 106.6 | 99.7 |
| 10000 | 96.8 | 99.8 |

The efficiency is increasing with the cycle number, reaching about 99.8% after 10,000 cycles. Such efficiency shows very stable systems. Furthermore, the specific discharge capacitance has also been reported in table 3 and confirms the decrease observed in FIG. 15. This may be due to the disappearance of some pseudocapacitive contributions.

Finally after 10,000 cycles, the specific capacitance of the system remains at about 97 F·g$^{-1}$ (see table 3). The capacitance loss after 10,000 cycles is smaller than for a capacitor with AC electrodes of different mass. Hence, using electrodes of approximately same thickness but with carbons of different nature enables a better cycle life of the capacitor of the present disclosure. Following equation 1, the maximum energy density is about 23 Wh·kg$^{-1}$ for the asymmetric first AC electrode and second AC900 electrode capacitor with R equal to about 1. This value is slightly higher than the one obtained for the asymmetric first AC electrode and second AC electrode capacitor with R equal to about 1.5 and around 75% better than the performances observed for the symmetric capacitor.

What is claimed is:

1. An electrochemical capacitor comprising:
a first electrode being directly connected to a positive terminal of a power source during the charge of the electrochemical capacitor;
a second electrode being directly connected to a negative terminal of a power source during the charge of the electrochemical capacitor, the first and the second electrodes each defining a single body having an active material consisting of nanoporous carbon, and
a porous separator to separate the first and second electrodes and to be impregnated with an almost neutral aqueous electrolyte having a pH between 5 and 9 and situated between the two electrodes, the neutral aqueous electrolyte comprising a salt formed by a metallic cation and an anion,
wherein the first electrode is different from the second electrode;
wherein the first and the second electrodes are made of different material;
wherein the first electrode is made of a carbon material more oxidized than the carbon material of the second electrode;
wherein the carbon material of the first electrode includes about 2.5% of oxygen atoms and the carbon material of the second electrode includes about 1% of oxygen atoms.

2. The electrochemical capacitor according to claim 1, wherein the cation is selected among elements of groups I and II of Mendeleev table, excluding hydrogen, radium and francium.

3. The electrochemical capacitor according to claim 1, wherein the mass of the first electrode and the mass of the second electrode are substantially equal.

4. The electrochemical capacitor according to claim 1, wherein the mass of the first electrode is superior to the mass of the second electrode, in particular about 1.5 times greater than the mass of the second electrode.

5. The electrochemical capacitor according to claim 1, wherein the aqueous electrolyte comprises as salt Li$_2$SO$_4$, Na$_2$SO$_4$, K$_2$SO$_4$, Rb$_2$SO$_4$, Cs$_2$SO$_4$, MgSO$_4$, LiNO$_3$, NaNO$_3$, KNO$_3$, RbNO$_3$, CsNO$_3$, Mg(NO$_3$)$_2$.

6. The electrochemical capacitor according to claim 1, wherein the concentration of the salt is between 0.1 mol·L$^{-1}$ and 5 mol·L$^{-1}$.

7. The electrochemical capacitor according to claim 1, wherein both electrodes comprise a nano-scale textured carbon material, in particular activated carbon.

8. The electrochemical capacitor according to claim 1, wherein the electrochemical capacitor is connected to at least one of a battery, a fuel cell and an engine.

9. An electrochemical capacitor assembly comprising a plurality of electrochemical capacitors according to claim 1 connected to each other in series and/or in parallel.

10. An electrical circuit comprising at least one electrochemical capacitor according to claim 1.

11. The electrochemical capacitor according to claim 1, wherein the electrochemical capacitor is an asymmetic capacitor.

12. The electrochemical capacitor according to claim 1, wherein the electrochemical capacitor reaches a maximum voltage that is in the range of 1.6 volts up to 1.9 volts.

13. The electrochemical capacitor according to claim 1, wherein the electrochemical capacitor stores charges by two processes, wherein one process corresponds to an electrostatic charge separation phenomenon and the second process involves the occurrence of redox reactions occurring at interfaces associated with each of the first and second electrodes.

* * * * *